(12) United States Patent
Takahashi

(10) Patent No.: US 11,522,287 B2
(45) Date of Patent: Dec. 6, 2022

(54) ACTIVE PHASED ARRAY ANTENNA

(71) Applicant: Mitsubishi Electric Corporation, Tokyo (JP)

(72) Inventor: Yoshinori Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 16/964,275

(22) PCT Filed: May 14, 2018

(86) PCT No.: PCT/JP2018/018569
§ 371 (c)(1),
(2) Date: Jul. 23, 2020

(87) PCT Pub. No.: WO2019/220508
PCT Pub. Date: Nov. 21, 2019

(65) Prior Publication Data
US 2021/0036422 A1 Feb. 4, 2021

(51) Int. Cl.
*H01Q 3/36* (2006.01)
*H01Q 3/26* (2006.01)

(52) U.S. Cl.
CPC ............. *H01Q 3/36* (2013.01); *H01Q 3/2694* (2013.01)

(58) Field of Classification Search
None
See application file for complete search history.

(56) References Cited

U.S. PATENT DOCUMENTS

| | | | | |
|---|---|---|---|---|
| 5,084,708 A | * | 1/1992 | Champeau | H01Q 3/2682 342/377 |
| 6,380,908 B1 | * | 4/2002 | Andrews | H01Q 3/26 342/375 |
| 6,496,137 B1 | | 12/2002 | Johansson | |

(Continued)

FOREIGN PATENT DOCUMENTS

| EP | 1891700 B1 | 2/2013 |
|---|---|---|
| JP | 2006267016 A | 10/2006 |

(Continued)

OTHER PUBLICATIONS

Microchip: Analog-to-Digital Converter Design Guide, pp. 1-24. 2005 (Year: 2005).*

(Continued)

*Primary Examiner* — Gregory C. Issing
(74) *Attorney, Agent, or Firm* — Studebaker & Brackett PC

(57) ABSTRACT

A plurality of reception modules (1a,1b) receive signals from a plurality of antennas (2a,2b) respectively. A synthesizer (3) synthesizes output signals of the plurality of reception modules (1a,1b). Each of the plurality of reception modules (1a, 1b) includes a first sample-and-hold circuit (7a,7b) sampling and holding a received signal, a second sample-and-hold circuit (8a,8b) sampling and holding an output signal of the first sample-and-hold circuit (7a,7b), and a controller (9a,9b) controlling a timing at which the first sample-and-hold circuit (7a,7b) samples and holds the signal. Operation timings of the first sample-and-hold circuits (7a,7b) are set for the respective reception modules (1a,1b). Operation timings of the second sample-and-hold circuits (8a,8b) of the plurality of reception modules (1a,1b) are same.

7 Claims, 4 Drawing Sheets

(56) References Cited

U.S. PATENT DOCUMENTS

| | | | | |
|---|---|---|---|---|
| 6,748,025 | B1* | 6/2004 | Hickling | H04B 1/0039 |
| | | | | 375/247 |
| 7,123,882 | B1* | 10/2006 | Frazier | H01Q 3/26 |
| | | | | 455/73 |
| 8,325,865 | B1* | 12/2012 | Rofougaran | H04B 1/001 |
| | | | | 375/350 |
| 8,629,807 | B2* | 1/2014 | Wood | G01S 7/03 |
| | | | | 342/372 |
| 2009/0296666 | A1 | 12/2009 | Rimini | |
| 2009/0315747 | A1* | 12/2009 | Nee | H01Q 3/2682 |
| | | | | 341/122 |
| 2012/0319746 | A1 | 12/2012 | Hayashi et al. | |

FOREIGN PATENT DOCUMENTS

| | | | |
|---|---|---|---|
| JP | 4533572 | B2 | 9/2010 |
| JP | 5377750 | B2 | 12/2013 |

OTHER PUBLICATIONS

Zhu et al. "Analog to Digital Converters." https://ume.gatech.edu/mechatronics_course/ADC_F08.pdf pp. 1-57. 2008 (Year: 2008).*

Office Action issued in TW 107128969; mailed by the Taiwan Intellectual Property Office dated Jul. 9, 2019.

International Search Report; Written Opinion; and Notification of Transmittal of The International Search Report and the Written Opinion of the International Searching Authority, or the Declaration issued in PCT/JP2018/018569; dated Jun. 19, 2018.

* cited by examiner

ACTIVE PHASED ARRAY ANTENNA

FIELD

The present invention relates to an active phased array antenna configured to receive electromagnetic wave through a plurality of antennas.

BACKGROUND

A phased array antenna enables electronical scanning of a radio wave beam by controlling the phases of radio frequency (RF) signals received from a plurality of antennas. A phased array antenna in which an active circuit such as an amplification circuit is placed between each antenna and a phase device is called an active phased array antenna. In the active phased array antenna, the phase of a signal received from each antenna is controlled by the phase device, and the signals are synthesized by a synthesizer.

Practically, to control the phase of a received signal in a phased array antenna, the group delay of the received signal needs to be controlled. In a case of a line spectrum signal with no frequency band, a phase difference and a group delay difference may completely match. However, with a wider frequency band of a signal, although a beam of the signal at the band center is accurately radiated in a set direction, error occurs to the angle of radiation for a signal at a band edge. The influence is significant in a case of an antenna having a large aperture or a signal having a wide frequency band. To solve this problem, a technology providing a delay time difference to sampling clocks of an AD converter and a DA converter has been proposed (refer to PTL 1, for example).

CITATION LIST

Patent Literature

[PTL 1] Japanese Patent No. 4533572

SUMMARY

Technical Problem

In the conventional technology, received signals are synthesized by digital calculation. In a case of a large antenna aperture size, which leads to a significant error in phase control, there is a large number of antennas, resulting in a significantly large number of buses through which digital signals are transmitted. Thus, this may not be feasible in some cases due to constraint on a substrate design or the number of terminals of an IC configured to perform digital calculation. In addition, in a case of a wide signal frequency band, the data rate is high because the Nyquist frequency of an AD converter is high, and thus this may not be feasible in some cases due to the processing capacity of an IC configured to perform digital calculation.

An object of the present invention, which has been made to solve the problem as described above, is to provide an active phased array antenna capable of controlling a delay time without performing digital synthesis arithmetic processing.

Solution to Problem

An active phased array antenna according to the present disclosure includes: a plurality of antennas; a plurality of reception modules receiving signals from the plurality of antennas respectively; and a synthesizer synthesizing output signals of the plurality of reception modules, wherein each of the plurality of reception modules includes a first sample-and-hold circuit sampling and holding a received signal, a second sample-and-hold circuit sampling and holding an output signal of the first sample-and-hold circuit, and a controller controlling a timing at which the first sample-and-hold circuit samples and holds the signal, operation timings of the first sample-and-hold circuits are set for the respective reception modules, and operation timings of the second sample-and-hold circuits of the plurality of reception modules are same.

Advantageous Effects of Invention

In the present disclosure, the operation timing of the first sample-and-hold circuits configured to sample and hold received signals are set for the respective reception modules, the operation timings of the second sample-and-hold circuits configured to sample and hold output signals of the first sample-and-hold circuits are same between the plurality of reception modules, and output signals of the plurality of reception modules are synthesized. Accordingly, a delay time can be controlled without performing digital synthesis arithmetic processing.

DESCRIPTION OF EMBODIMENTS

An active phased array antenna according to the embodiments of the present disclosure will be described with reference to the drawings. The same components will be denoted by the same symbols, and the repeated description thereof may be omitted.

Embodiment 1

Figure 1:
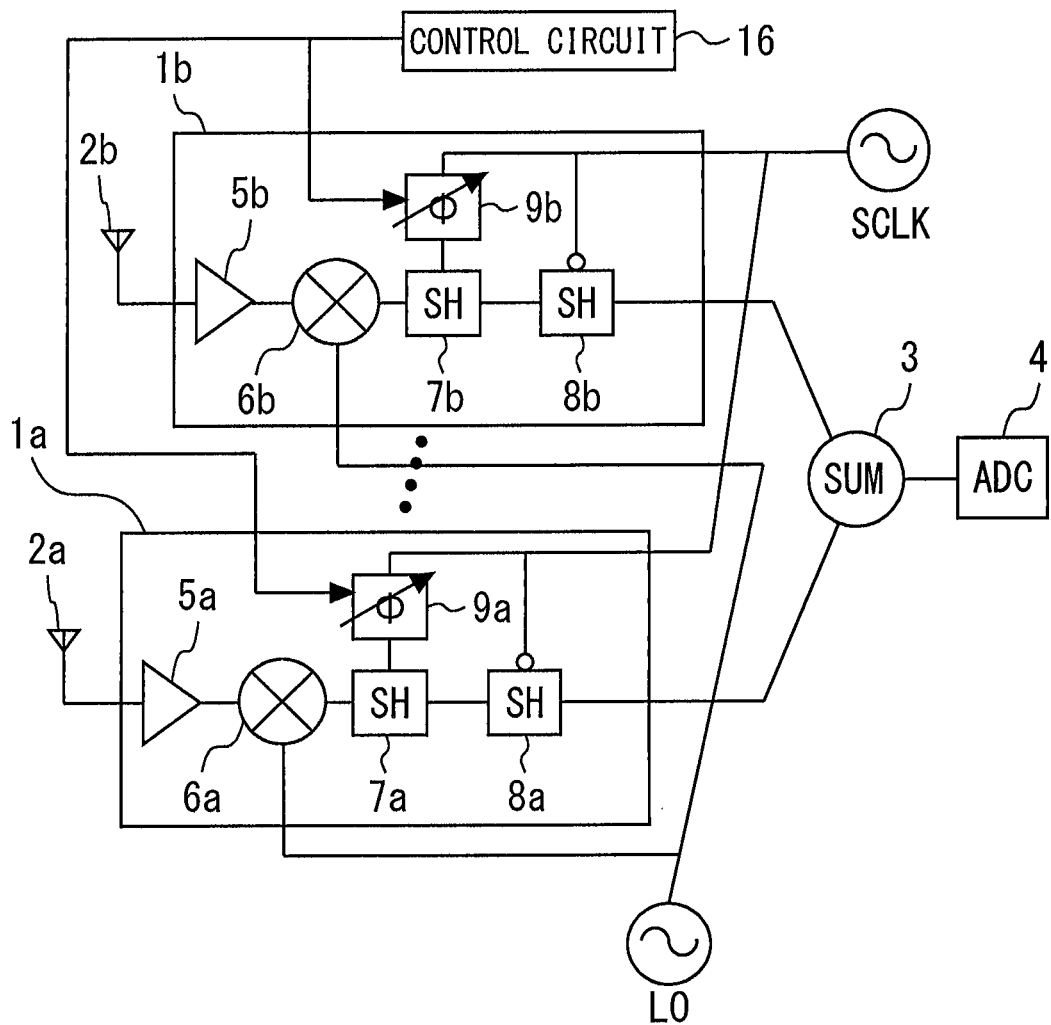
FIG. 1 is a block diagram illustrating an active phased array antenna according to Embodiment 1.

FIG. 1 is a block diagram illustrating an active phased array antenna according to Embodiment 1. A plurality of reception modules 1a and 1b receive signals from a plurality of antennas 2a and 2b, respectively. A synthesizer 3 synthesizes output signals of the plurality of reception modules 1a and 1b. An AD converter 4 converts a signal obtained through the synthesis by the synthesizer 3 into digital data.

The reception module 1a includes a low noise amplifier 5a, a frequency conversion unit 6a, a first sample-and-hold circuit 7a, a second sample-and-hold circuit 8a, and a phase shifter 9a. The low noise amplifier 5a amplifies the electrical power of a signal received from the corresponding antenna 2a. The frequency conversion unit 6a converts the frequency of the amplified signal from a carrier wave band into a frequency band that can be AD converted. The first sample-and-hold circuit 7a samples and holds the frequency-converted signal in accordance with an input clock. The second sample-and-hold circuit 8a samples and holds an output signal of the first sample-and-hold circuit 7a. The phase shifter 9a controls a timing at which the first sample-and-hold circuit 7a samples and holds the signal.

Similarly, the reception module 1b includes a low noise amplifier 5b, a frequency conversion unit 6b, a first sample-and-hold circuit 7b, a second sample-and-hold circuit 8b, and a phase shifter 9b. Each component has a function same as that in the reception module 1a.

A local oscillator LO generates a local oscillation signal for the frequency conversion of each of the frequency conversion units 6a and 6b. The phase shift amount of each of the phase shifters 9a and 9b is smaller than ±90°. A sampling clock source SCLK generates a sampling clock for driving the first sample-and-hold circuits 7a and 7b and the second sample-and-hold circuits 8a and 8b. However, the operation timings of the first sample-and-hold circuits 7a and 7b are set for the respective reception modules 1a and 1b by the phase shifters 9a and 9b, but the operation timings of the second sample-and-hold circuits 8a and 8b of the plurality of reception modules 1a and 1b are same.

Figure 2:
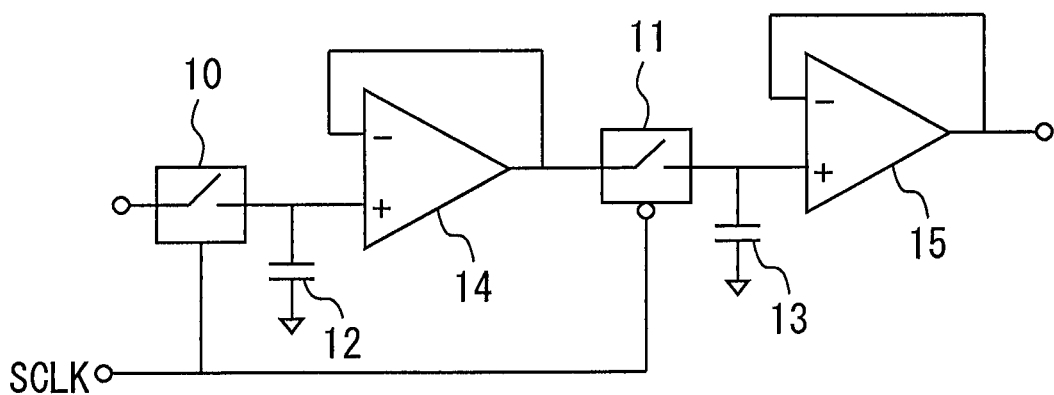
FIG. 2 is a block diagram illustrating each sample-and-hold circuit according to Embodiment 1.

FIG. 2 is a block diagram illustrating each sample-and-hold circuit according to Embodiment 1. The first sample-and-hold circuits 7a and 7b and the second sample-and-hold circuits 8a and 8b each include switches 10 and 11, capacitors 12 and 13, and voltage followers 14 and 15. Input voltage is sampled when the switch 10 is short-circuited, and the input voltage is held by the capacitor 12 when the switch 10 is opened. The held voltage is sampled-and-held by a capacitor 13 through a switch 11 configured to operate at polarity opposite to that of the switch 10 and through the voltage follower 14, and is output through the voltage follower 15.

Figure 3:
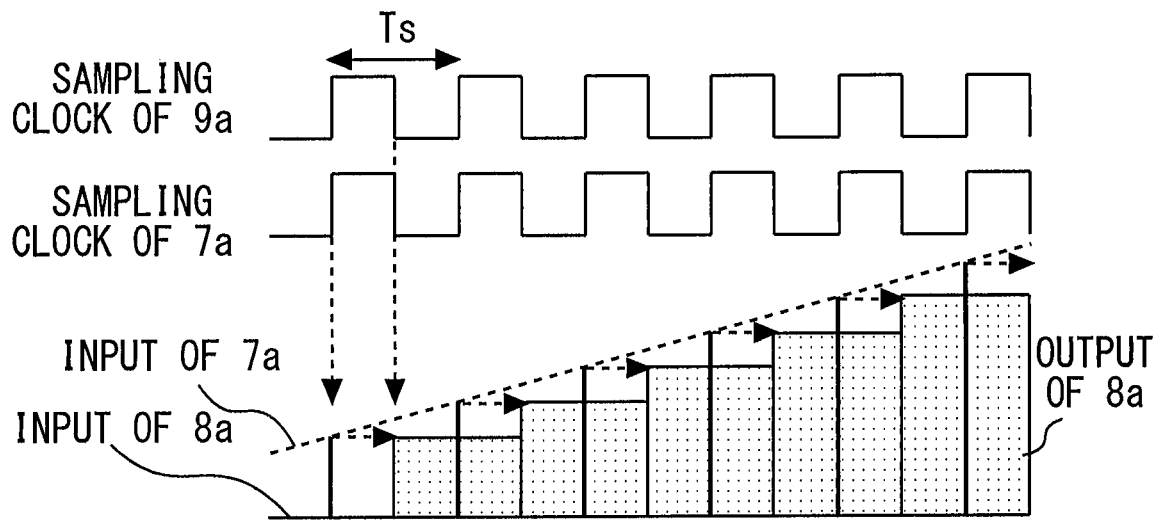
FIG. 3 is a diagram illustrating the operation timing of a reception module.
Figure 4:
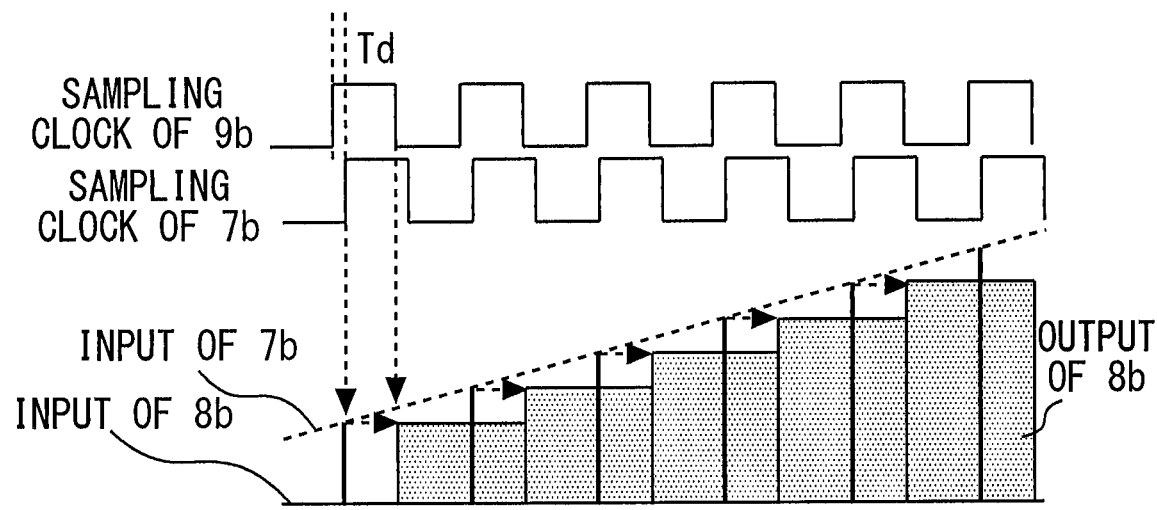
FIG. 4 is a diagram illustrating the operation timing of a reception module.
Figure 5:
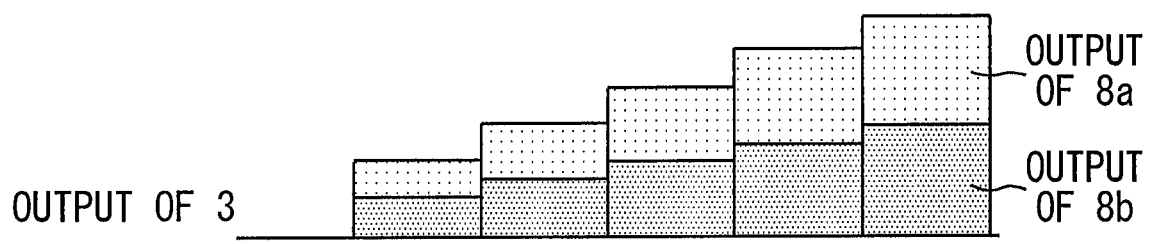
FIG. 5 is a diagram illustrating an output signal of the synthesizer.

The following describes the operation of the active phased array antenna according to the present embodiment. FIGS. 3 and 4 are each a diagram illustrating the operation timing of a reception module. FIG. 3 illustrates the operation timing of the reception module 1a, and FIG. 4 illustrates the operation timing of the reception module 1b. FIG. 5 is a diagram illustrating an output signal of the synthesizer.

Signal electromagnetic waves radiated and propagated from the outside are transferred to the reception modules 1a and 1b through the antennas 2a and 2b, respectively. Signals amplified and frequency-converted in the modules are input to the first sample-and-hold circuits 7a and 7b.

A sampling clock having a period Ts is supplied from the sampling clock source SCLK. The phase shifters 9a and 9b each shift the phase of the sampling clock. The first sample-and-hold circuits 7a and 7b each sample the voltage of a signal at a rising edge of the sampling clock output from the corresponding one of the phase shifters 9a and 9b, and maintains a zero-th hold waveform until the next rising edge. A control circuit 16 sets the amounts of phase shift by the phase shifters 9a and 9b for the respective modules so that a desired antenna face can be obtained after synthesis. In this example, the phase shift amount of the phase shifter 9a is 0°, and the phase amount of the phase shifter 9b is $\phi$°. In this case, the first sample-and-hold circuit 7b performs signal sampling and holding at a timing delayed behind the first sample-and-hold circuit 7a by Td=Ts·$\phi$/360.

The second sample-and-hold circuits 8a and 8b each sample and hold an output signal of the corresponding one of the first sample-and-hold circuits 7a and 7b at a falling edge of the sampling clock. The synthesizer 3 adds and synthesizes output signals of the second sample-and-hold circuits 8a and 8b of the plurality of reception modules 1a and 1b. The AD converter 4 converts an output signal of the synthesizer 3 into a digital signal.

As described above, the first sample-and-hold circuit 7b performs sampling and holding at the timing delayed behind the first sample-and-hold circuit 7a by Td. Thus, the synthesis of output signals of the reception modules 1a and 1b by the synthesizer 3 is equivalent to signal delay of Td relative to the reception module 1b by the reception module 1a.

As described above, in the present embodiment, the operation timings of the first sample-and-hold circuits 7a and 7b configured to sample and hold received signals are set for the respective reception modules 1a and 1b, the operation timings of the second sample-and-hold circuits 8a and 8b configured to sample and hold output signals of the first sample-and-hold circuits 7a and 7b are same between the plurality of reception modules 1a and 1b, and output signals of the plurality of reception modules 1a and 1b are synthesized. Accordingly, a delay time can be controlled without performing digital synthesis arithmetic processing. Thus, there is no need to provide a large number of signal bus wires, and a lightweight and compact active phased array antenna with low electric power consumption can be obtained. This active phased array antenna can be achieved even in a case of a large antenna aperture size and a wide signal frequency band.

In addition, the operation timings of the first sample-and-hold circuits 7a and 7b can be easily controlled by setting the amounts of phase shift by the phase shifters 9a and 9b configured to shift the phase of the sampling clock in the first sample-and-hold circuits 7a and 7b.

Embodiment 2

Figure 6:
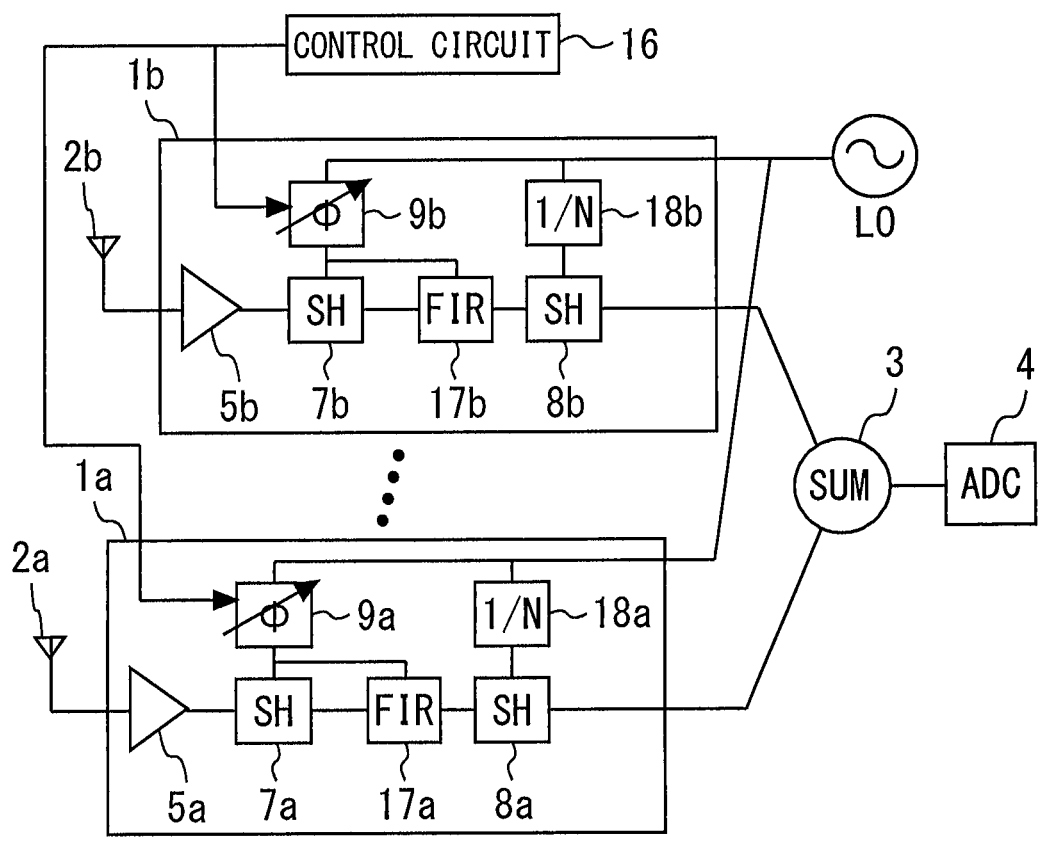
FIG. 6 is a block diagram illustrating an active phased array antenna according to Embodiment 2.

FIG. 6 is a block diagram illustrating an active phased array antenna according to Embodiment 2. In the present embodiment, the first sample-and-hold circuits 7a and 7b each directly sample and hold a carrier wave band signal and simultaneously perform frequency conversion and sampling-holding. FIR filters 17a and 17b are rate converters configured to perform rate conversion of the sampling rates of output signals of the respective first sample-and-hold circuits 7a and 7b, and remove unnecessary signals while decreasing the sampling rates and maintaining the linearity of phase shift.

The phase shifters 9a and 9b shift the phase of the local oscillation signal to generate sampling clocks of the respective first sample-and-hold circuits 7a and 7b. The local oscillation signal has an extremely high frequency relative to a signal bandwidth and thus is converted to a necessary and sufficient sampling rate to facilitate the following circuit processing. The phase shifters 9a and 9b also function as local oscillator for the frequency conversion of the first sample-and-hold circuits 7a and 7b. Frequency dividers 18a and 18b generate sampling clocks common to the second sample-and-hold circuits 8a and 8b by dividing the local oscillation signal to rates same as those of the FIR filters 17a and 17b.

Figure 7:
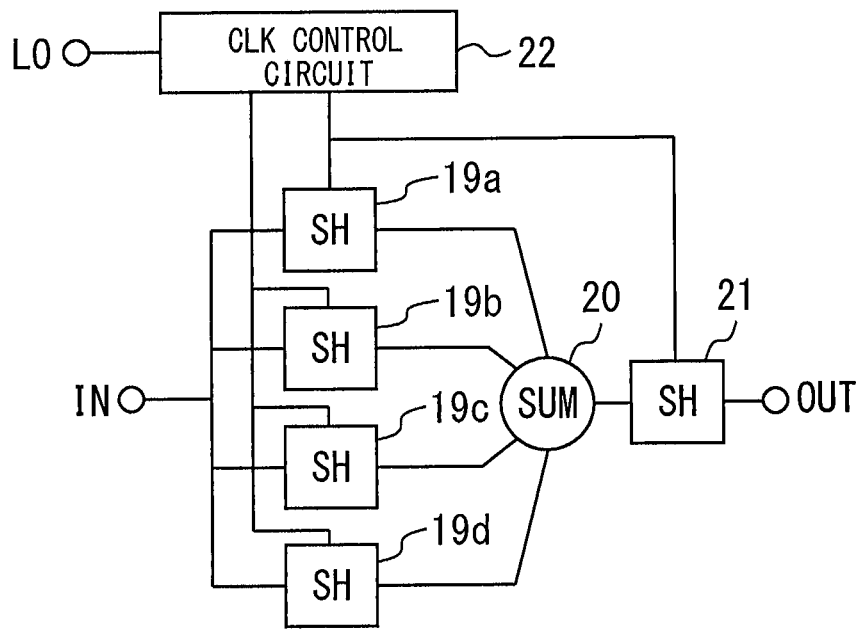
FIG. 7 is a block diagram illustrating an FIR filter.

FIG. 7 is a block diagram illustrating an FIR filter. This FIR filter is a moving-average filter with four taps. A plurality of sample-and-hold circuits 19a to 19d sample and hold input signals. An adder 20 adds output signals of the plurality of sample-and-hold circuits 19a to 19d. A sampleand-hold circuit 21 samples and holds an output signal of the adder 20. A clock control circuit 22 generates a sampling clock for driving the sample-and-hold circuits 19a to 19d and 21.

Figure 8:
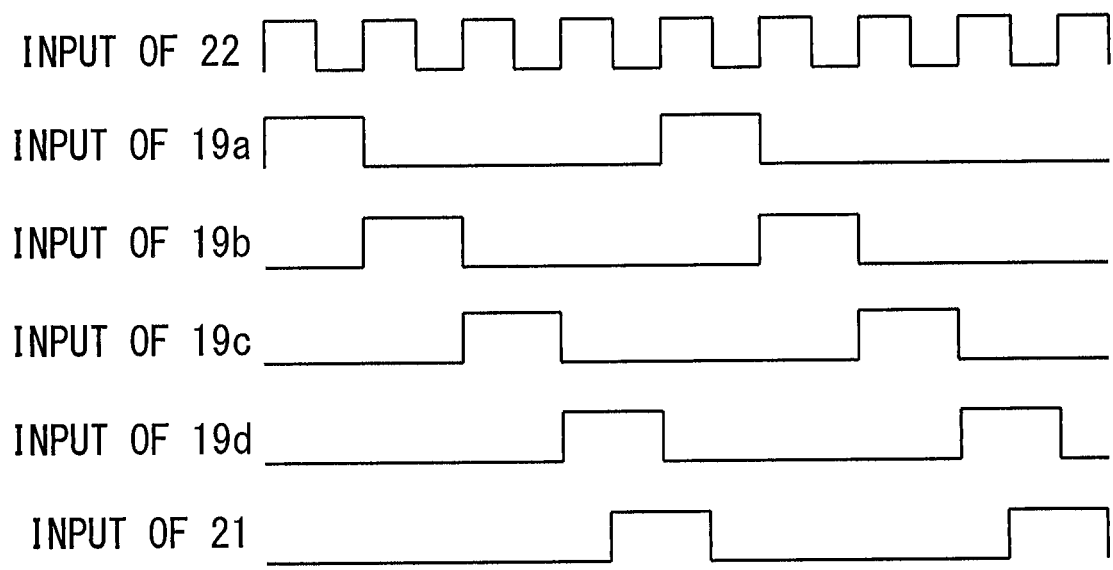
FIG. 8 is a timing chart illustrating the operation of an FIR filter.

FIG. 8 is a timing chart illustrating the operation of an FIR filter. A signal having a period four times longer than the clock of five local oscillation signals and having a duty of 25% is output from the clock control circuit. The sample-and-hold circuits 19a to 19d sample and hold input signals at four timings different from one another. When the four sample-and-hold circuits 19a to 19d all complete the sampling and holding, the sample-and-hold circuit 21 outputs an output signal of the adder 20. Since the pieces of sample-and-hold data of the four timings are added, the output result is a moving average, and the FIR filter has a low-pass characteristic. Simultaneously, the sampling rate is converted to ¼ of the original rate.

The following describes the operation of the active phased array antenna according to the present embodiment. Signal electromagnetic waves radiated and propagated from the outside are transferred to the reception modules 1a and 1b through the antennas 2a and 2b, respectively. Signals amplified in the modules are input to the first sample-and-hold circuits 7a and 7b. The first sample-and-hold circuits 7a and 7b each perform sampling and holding based on a sampling clock obtained by shifting a local oscillation signal at the corresponding one of the phase shifters 9a and 9b, and simultaneously perform frequency conversion. In this case, when the phase shift amount of the phase shifter 9a is 0° and the phase amount of the phase shifter 9b is $\phi$°, the first sample-and-hold circuit 7b performs signal sampling and holding at a timing delayed behind the first sample-and-hold circuit 7a by Td=Ts·$\phi$/360. An output signal of each of the first sample-and-hold circuits 7a and 7b is sampled-and-held by the corresponding one of the second sample-and-hold circuits 8a and 8b at a falling timing of the sampling clock and then output.

Similarly to Embodiment 1, the first sample-and-hold circuit 7b performs sampling and holding at a timing delayed behind the first sample-and-hold circuit 7a by Td. Thus, the synthesis of output signals of the reception modules 1a and 1b by the synthesizer 3 is equivalent to signal delay of Td relative to the reception module 1b by the reception module 1a. Accordingly, a delay time can be controlled without performing digital synthesis arithmetic processing.

In the present embodiment, the first sample-and-hold circuits 7a and 7b perform signal frequency conversion and sampling-holding, and the FIR filters 17a and 17b perform rate conversion of the sampling rates of output signals of the first sample-and-hold circuits 7a and 7b. Accordingly, signal lines for the frequency conversion units 6a and 6b and the sampling clock source SCLK are unnecessary, and thus a smaller-sized active phased array antenna can be achieved.

In addition, the FIR filters 17a and 17b can remove any unnecessary signal while performing rate conversion of the sampling rates.

REFERENCE SIGNS LIST 1a, 1b reception module; 2a,2b antenna; 3 synthesizer; 7a,7b first sample-and-hold circuit; 8a,8b second sample-and-hold circuit; 9a,9b phase shifter (controller); 17a,17b FIR filter (rate converter)

The invention claimed is:

1. An active phased array antenna comprising:
a plurality of antennas;
a plurality of reception modules configured to receive signals from the plurality of antennas respectively; and
a synthesizer configured to synthesize output signals of the plurality of reception modules, wherein
each of the plurality of reception modules includes a first sample-and-hold circuit configured to sample and hold a received signal, a second sample-and-hold circuit configured to sample and hold an analog output signal of the first sample-and-hold circuit, and a controller configured to control operation timings at which the first sample-and-hold circuits sample and hold the signal,
the controller is further configured to set the operation timings of the first sample-and-hold circuits for each of the plurality of reception modules, and
operation timings of the second sample-and-hold circuits of each of the plurality of reception modules are the same.

2. The active phased array antenna according to claim 1, wherein the controller includes a phase shifter configured to shift a phase of a sampling clock of the first sample-and-hold circuit.

3. The active phased array antenna according to claim 1, wherein the first sample-and-hold circuit is configured to perform frequency conversion and sampling-holding of the signal, and
the reception module includes a rate converter configured to perform rate conversion of a sampling rate of an output signal of the first sample-and-hold circuit.

4. The active phased array antenna according to claim 3, wherein the rate converter includes an FIR filter.

5. The active phased array antenna according to claim 2, wherein the first sample-and-hold circuit is configured to perform frequency conversion and sampling-holding of the signal, and
the reception module includes a rate converter configured to perform rate conversion of a sampling rate of an output signal of the first sample-and-hold circuit.

6. The active phased array antenna according to claim 5, wherein the rate converter includes an FIR filter.

7. The active phased array antenna according to claim 1, wherein the second sample-and-hold circuit is configured to output an other analog output signal.

* * * * *